(No Model.)
J. T. VAN GESTEL.
SECONDARY BATTERY.
No. 405,751. Patented June 25, 1889.
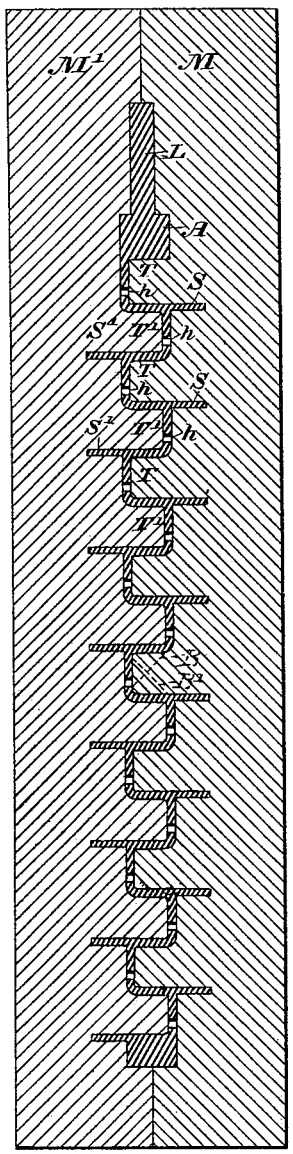
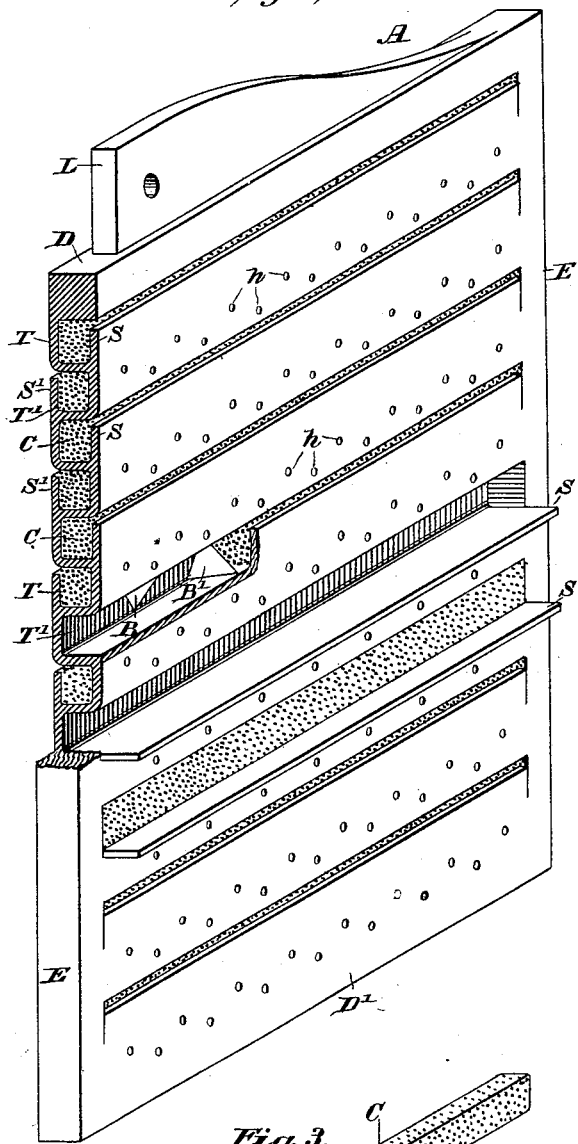
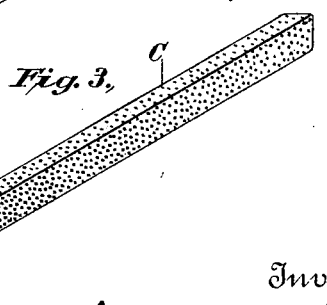
Witnesses
Geo. W. Breck.
Carrie E. Ashley
Inventor
Jean Theodore van Gestel
By his Attorneys
Wiedersheim & Kintner

UNITED STATES PATENT OFFICE.

JEAN THEODORE VAN GESTEL, OF NEW YORK, N. Y.

SECONDARY BATTERY.

SPECIFICATION forming part of Letters Patent No. 405,751, dated June 25, 1889.

Application filed October 2, 1888. Serial No. 287,016. (No model.)

*To all whom it may concern:*

Be it known that I, JEAN THEODORE VAN GESTEL, a subject of the King of The Netherlands, and a resident of New York, county of New York, and State of New York, have made a new and useful invention in Secondary or Storage Batteries, of which the following specification, taken in connection with the accompanying drawings, affords a full, clear, and exact description.

My invention relates particularly to that class of storage-batteries in which the active material is held in place on the faces of the electrodes; and to this end it consists, first, in a novel support or sustaining-plate for the active material or material adapted to become active, which is made preferably of a single piece of sheet-lead pressed into such shape as to create retaining-shelves on its opposite faces, such shelves being preferably supported or braced by brackets, as shown.

It consists, second, in the combination of this novel form of support or sustaining-plate with hard compressed pencil electrodes of the construction hereinafter disclosed.

My invention will be fully understood by referring to the drawings, in which—

Figure 1 is a perspective view of my improved electrode complete, parts being broken away to show the internal construction. Fig. 2 is a cross-sectional view showing the body or plate of the electrode in the press during the process of forming, and Fig. 3 is a perspective view of a compressed pencil of active material.

A is the electrode-frame proper, having the usual lug or ear L at its top.

I take a piece of sheet-lead or analogous material and place it in the press or mold M M', Fig. 2. On applying high pressure, as hydraulic, the lead is forced into the grooves of the respective parts M M' of this mold or press and the frame A is produced having ribs or sides D E at its top, bottom, and edges.

T and T' are a series of shelves or troughs formed by the back zigzag disposition of the metal in the mold or press and having lips or ledges S S' extending horizontally to the left and right, as shown in Fig. 2, before the active material is put in place. These troughs are perforated on their rear sides, as shown at $h$, to admit the electrolyte.

B B are bracing or sustaining brackets arranged at intervals between the troughs and integral therewith, the necessary grooves being provided in the mold or press for producing them. The brackets B connect the bottom of the shelves to their back walls, while brackets B' connect the interior bottoms to the same back walls. These brackets are arranged alternately, as shown, and materially strengthen the structure. This constitutes the electrode-plate preparatory to applying the active material, which consists, preferably, of compressed or hard pencils produced by compressing any of the well-known forms of active material into the shape or form shown in Fig. 3. I prefer to take minium, red lead, or any of the salts of lead ordinarily used as active material and place it in a mold or press, then subject it to immense pressure. By this method I produced a mass of active material which attains a volume fully twenty-five per cent. smaller than is possible to obtain by any of the well-known methods of applying active material to a plate or electrode. These pencils are then laid in the shelves or troughs T and T', and the lips S S' turned up in the manner shown, so that they are to all intents and purposes completely encompassed. When they are of the length shown in Fig. 3, I construct the electrode-plate without the brackets B and B', but make the pencils of such shape as to fit snugly in the shelves or troughs T and T', and then turn up the lips or edges S S', wholly encompassing them, if desired. When the electrode-plate is constructed with the brackets, I provide short rectangular pencils adapted to fit between any two sets of brackets. With this construction of electrode the active material is so thoroughly encompassed that it cannot break loose or disintegrate, and the peculiar expansibility of the shelves permits of free and full expansion in all directions.

I am aware that electrodes for secondary or storage batteries have been devised having troughs or shelves located on opposite sides of a common back plate and with upturned edges or lips, and I make no claim, therefore, to such feature, broadly. I believe it is new with me to arrange the troughs or shelves on opposite sides of different level and above each other.

I am also aware that active material has been forced into the faces of electrode-plates by hydraulic pressure, and that electrodes made wholly of active material under high pressure are not new, and I disclaim these features here. I wish it to be understood, however, that I do not desire to be limited to the use of compressed pencils of active material with my improved support therefor, as it is obvious that I may use any of the well-known forms of active material instead.

Having thus described my invention, what I claim, and desire to secure by Letters Patent of the United States, is—

1. An electrode for a secondary or storage battery composed of a single piece of lead or analogous material, having troughs in its opposite faces, said troughs being integral with a common back wall and braced from above and below by brackets, substantially as described.

2. An electrode for a secondary or storage battery composed of lead or analogous material, having struck-up shelves extending across its face, said shelves being braced at intervals with brackets, substantially as described.

3. An electrode for a secondary or storage battery made of a single piece of conducting material, having troughs or shelves on its opposite faces for retaining the active material, said troughs being provided with intermediate bracing-brackets, substantially as described.

4. An electrode for a secondary or storage battery composed of a lead or analogous plate, having shelves for retaining the active material located at different levels on its opposite faces and in the same vertical plane, substantially as described.

5. An electrode for a secondary or storage battery made of a single piece of lead or analogous metal, having shelves or troughs on its opposite sides which encompass the active material when put in place, said shelves being braced by intervening brackets, substantially as described.

6. An electrode for a secondary or storage battery composed of a single piece of lead or analogous material, having perforated shelves on its opposite sides which encompass the active material when in place, said shelves being located at different levels on the opposite sides of the electrode and braced by intermediate brackets, substantially as described.

7. An electrode for a secondary or storage battery composed of lead or analogous material, having a series of retaining-shelves for the active material located on its opposite faces and all in the same vertical plane, in combination with active material held firmly in place by said shelves, substantially as described.

8. An electrode for a secondary or storage battery composed of a single piece of conducting metal, having shelves for the active material, said shelves being located on the opposite faces of the electrode in alternate succession and all in the same vertical plane, substantially as described.

9. An electrode for a secondary or storage battery composed of a single piece of lead or analogous conducting material, having a series of shelves or ledges for the active material located on its opposite faces, the backs and bottoms of the several shelves constituting the supports and tops of the shelves in sequence, substantially as described.

10. An electrode for a secondary or storage battery consisting of a supporting-plate having a series of retaining shelves or ledges on its opposite faces, the backs of which are perforated, in combination with active material held in place by the front edges or lips of said shelves or ledges, substantially as described.

11. An electrode for a secondary or storage battery composed of a single piece of lead or analogous material, having horizontally-disposed perforated shelves on opposite sides which encompass the active material, said shelves being located at different levels on the opposite side of the electrode and having sustaining-brackets located at intervals, the whole being so arranged that when the active material is in place it is encompassed by bent-up edges of the shelves, substantially as described.

JEAN THEODORE VAN GESTEL.

Witnesses:
C. J. KINTNER,
J. F. QUINN.